United States Patent [19]
Plamper et al.

[11] 3,783,216
[45] Jan. 1, 1974

[54] SAFETY SWITCH MECHANISM

[75] Inventors: Gerhard R. Plamper, Parma; Juergen Kaesgen, Brunswick, both of Ohio

[73] Assignee: MTD Products Inc., Cleveland, Ohio

[22] Filed: Nov. 6, 1972

[21] Appl. No.: 304,072

[52] U.S. Cl............... 200/161, 192/.098, 180/82 R, 307/10 R
[51] Int. Cl. ........................................... H01h 17/08
[58] Field of Search............................ 192/.084, .98; 180/82 R; 56/DIG. 15; 200/161, 61.59, 51.1; 307/10 R

[56] References Cited
UNITED STATES PATENTS

| | | | |
|---|---|---|---|
| 1,017,948 | 2/1912 | Boyston | 200/51.1 |
| 2,117,066 | 5/1938 | Liverance, Jr. | 200/153 M |
| 2,490,675 | 12/1949 | Clare | 200/161 |
| 3,626,676 | 12/1971 | Miley et al. | 192/.098 |

Primary Examiner—David Smith, Jr.
Attorney—George V. Woodling et al.

[57] ABSTRACT

A safety switch mechanism for use in connection with a recoil starter using a rope or cable. Such a starter is used on the usual internal combustion engine mounted on a vehicle such as a tractor which carries with it a powered tool such as a grass cutting unit. The mechanism is particularly adapted for safety systems wherein the engine is short-circuited so that the engine can not be started by pulling the rope or cable unless both the clutch of the tractor and the clutch of the powered tool are disengaged. This safety switch mechanism has a unique construction enabling it to be locked in open position so that the switch mechanism is not inadvertently opened by vibration or other means after the engine is started and the tractor and powered tool are being used. This is an abstract only of the specific illustration of the invention given by way of example, and is not to be used in the interpretation of the claims nor as a limitation on the scope of the invention.

4 Claims, 5 Drawing Figures

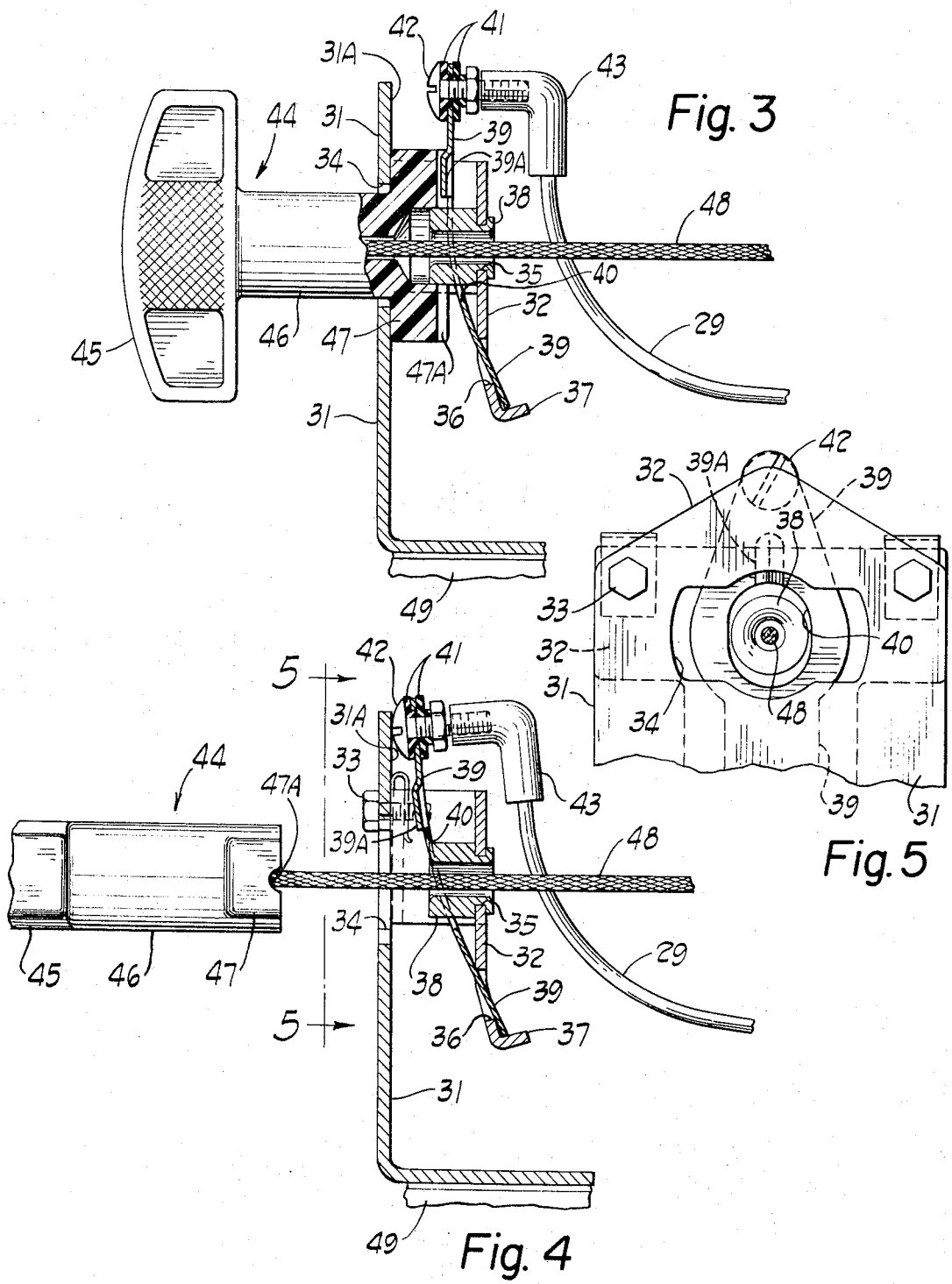

3,783,216

1

SAFETY SWITCH MECHANISM

This invention is related to, and constitutes improvement upon, the system disclosed in U.S. Pat. No. 3,626,676. Reference is made to that patent for a discussion of the background of the invention and for a discussion of the general purposes of such a safety switch actuated short-circuiting system.

In tractors or the like embodying the safety system disclosed in said U.S. Pat. No. 3,626,676, the safety switch tends to inadvertently open and close by vibration during use of the tractor and other means so that continued uninterrupted operation of the engine is not assured. Our safety switch mechanism provides a positive lock so that after the engine is started, with both clutches disengaged, then the tractor and the powered tool may be operated in the usual manner without danger of the engine being short-circuited and its ceasing to operate. The objects and advantages of our mechanism will become apparent upon consideration of the accompanying drawings and description.

An object of our invention is to provide improved operation of a tractor having a safe-start system which assures that the engine can not be started up by the recoil mechanism unless and until both the clutch of the tractor and the clutch of the powered tool are disengaged.

Another object is the provision for assuring improved and more efficient operation and use of the safety system.

Other objects and a fuller understanding of this invention may be had be referring to the following description and claims, taken in conjunction with the accompanying drawings, in which:

FIG. 3 is an enlarged view, partly in section, of our improved safety switch mechanism and showing the switch in open position and locked in such open position;

FIG. 4 is a view similar to that of FIG. 3 but showing the safety switch in closed position and not locked in open position; and FIG. 5 is a partial view of the safety switch mechanism looking in the direction of the arrows 5—5 of FIG. 4.

Figure 1:
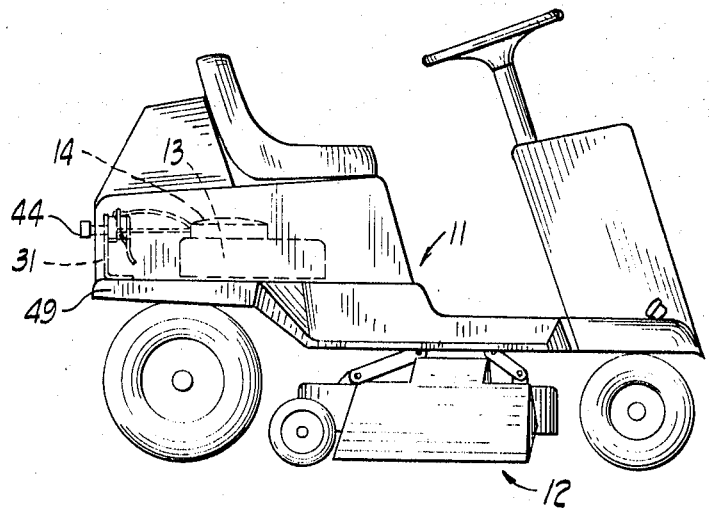
FIG. 1 is a side view of a mowing riding tractor to which the present invention is adapted as shown by way of example.

The tractor illustrating a use of our improved mechanism is indicated by the reference character 11 in FIG. 1. A powered cutting unit 12 is suspended below the tractor 11 in the usual way and the cutting unit has its cutting blades rotated in the usual manner by the power of the tractor through suitable power transmitting means. The tractor 11 and the cutting unit 12 each have a clutch. The clutch of the tractor 11 controls the transmission between the tractor engine 13 and the driving wheels of the tractor. The clutch of the cutting unit controls the power transmission between the cutting unit 12 and the engine 13. As these clutches are usual and their structure and operation is well known, they have not been illustrated in FIG. 1.

It is of course dangerous to start a tractor such as a powered mowing tractor, by pulling out the rope or cable of the recoil mechanism 14 unless both clutches are disengaged, otherwise there is a danger that the tractor may start moving as soon as the engine started and also that the cutting unit might start to operate as soon as the engine started. Therefore it is desired that both the tractor clutch and the cutting unit clutch be disengaged before the engine can be started by pulling out the rope or cable 48 of the recoil starting mechanism 14. The engine 13 includes a visual ignition system which may be tapped such as at 15 for short-circuiting the ignition system to make the engine inoperable. As is well known, the engine may be stopped and prevented from operating by short-circuiting the ignition system at 15 by providing a ground connection between such ignition system and the ground. In such a system the frame of the tractor is usually utilized as ground.

In our safe start system we utilize a wire 16 in connection with the electrical ignition system for the engine. As the ignition system is usual and well known, we have not shown the entire electrical ignition system but only wire 16 thereof which is utilized for our safety system. The wire 16 leads to the ignition switch 17 operated by a key in the usual manner.

Our system utilizes two normally closed switches 18 and 19. Switch 18 is moved or actuated by an actuating element 20 which through a linkage 22 is operated by the clutch of the tractor 11, for example. When the tractor clutch is disengaged, then the switch 18 is open by means of the element 20 and linkage 22.

The other normally closed switch 19 is moved or actuated by an actuating element 21 which in turn is actuated by a linkage 23 connected to the clutch of the cutting unit 12. Upon the disengagement of the cutting unit clutch the switch 19 is opened by the element 21 and linkage 23.

Figure 2:
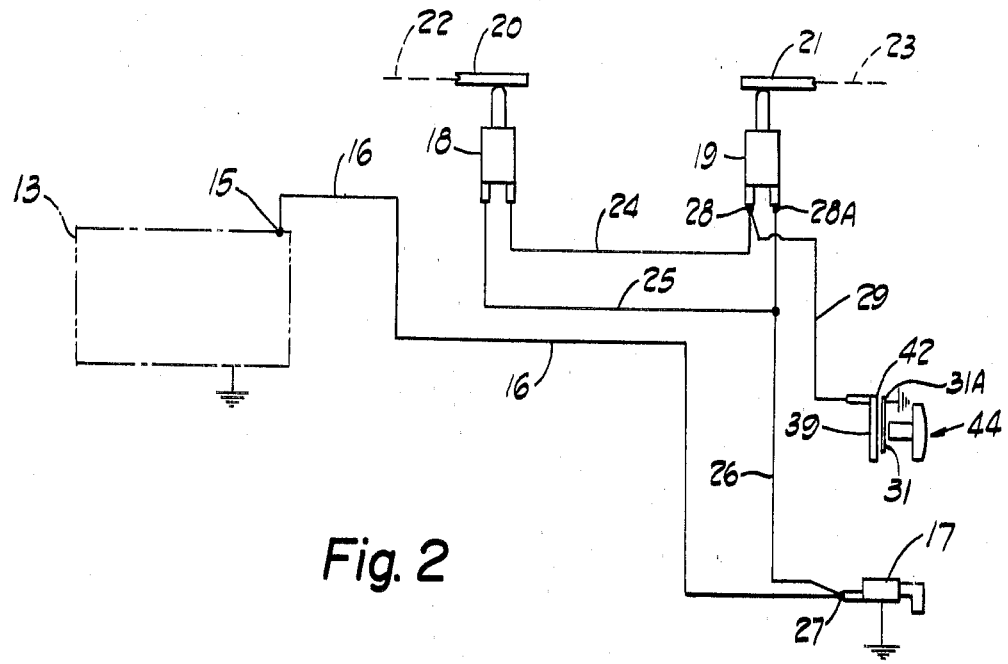
FIG. 2 is a diagrammatical view, including a circuit, illustrating the layout and operation of our improved system.

A wire 24 connects one pole or contact of each of the switches 18 and 19. Another wire 25 connects the other poles or contacts of the switches 18 and 19. The wire 25 is tapped at 28A to wire 26 and through wire 26 is tapped at 27 to wire 16. Wire 16 at its one end is connected to ignition system at 15. The other end of wire 16, as explained, is connected to the ignition switch 17. A wire 29 is tapped at 28 to wire 24. FIG. 2 shows the arrangement of the wires and connections described. It is thus seen that switches 18 and 19 as connected in parallel is a circuit made up of wires 24 and 25. The said circuit being connected to wire 16 to the ignition system at 15, and also being connected as shown to wire 29.

The safety switch mechanism is shown diagrammatically in FIG. 2, but its structure is shown in full and enlarged in FIGS. 3, 4 and 5. As seen in FIGS. 3, 4 and 5, there is a metal bracket 31 mounted upon the frame 49 of the tractor 11. Thus the metal bracket 31 is connected to ground by means of being mounted to the metal frame 49. This bracket 31 extends vertically upwardly from the frame at the rearwardmost end of the tractor or on side thereof for convenience and safety. An operator desiring to actuate the recoil mechanism by pulling out the starting rope or cable stands rearwardly or sidewardly of the tractor.

Mounted to the upper portion of the bracket 31 is a plate member 32 which has side portions which are secured to the bracket 31 by means of bolt and nut assemblies 33. As seen, the plate member 32 is U-shaped and there is provided an open space between the main portion of the plate member 32 and the bracket 31. The main portion of the plate member 32 and the upright portion of the bracket 31 are parallel and spaced apart.

There is provided in the vertical portion of the bracket 31 near its upper end a rectangular shaped opening 34. The major axis of this rectangular opening 34 is generally horizontal as better seen in FIG. 5. Aligned with this opening 34 is a smaller round hole 35 in the plate member 32. The aligned holes 34 and 35 accomodate a rope or cable 48 which is pulled out from the recoil starting mechanism in the usual manner for the starting of the engine. To provide a guide for the rope a bushing 38 is mounted in the opening 35 as illustrated. It may be of nylon or other suitable material against which the rope or cable may bear in its longitudinal movement. Mounted to the plate member 32 is a leaf spring 39 in such a manner as to be biased or resiliently urged toward the position shown in FIG. 4. The lower end of the leaf spring 39 extends through a slot 36 in the lower end portion of the plate member 32 and abuts against the bent-over portion 37. In this manner the leaf spring is anchored to the lower end of the plate member 32 in a manner to resiliently urge the upper end of the leaf spring 39 to the left in FIGS. 3 and 4, that is toward its position shown in FIG. 4. An opening 40 is provided in the leaf spring 39 intermediate of its ends for accomodating the bushing 38. The leaf spring may freely swing in its movement without interference from the bushing 38.

Mounted upon the upper free end of the leaf spring 39 is a movable switch element 42. The switch element 42 is electrically insulated from the metal spring 39 by fibre washers 41. This switch element 42 is a bolt secured in a fitting 43 which is suitably electrically insulated but provides that the switch element 42 is electrically connected to the wire 29 through the fitting 43. The upper end of the bracket 31 facing the switch element 42 has a contact surface indicated by the reference character 31A. Thus when the switch element 42 is swung to the left in FIGS. 3 and 4 under the bias of leaf spring 39, the switch element 42 electrically engages the contact surface 31A as shown in FIG. 4.

Firmly secured to the outer or free end of the starting rope or cable 48 is a starting or actuating member 44. This member 44 has a handle portion 45, a shank portion 46, and a locking portion 47. Preferably portions 45, 46 and 47 are integral and are molded of a suitable plastic material. There is a space between the portion 45 and the portion 46 for accommodating the fingers of an operator seizing the handle portion 45 and for pulling the rope or cable 48 outwardly, that is toward the left in FIGS. 3 and 4.

The locking portion 47 is rectangular in cross-section and complements the rectangular opening 34 in the bracket 31, although slightly smaller in dimensions than the opening 34. The shape and dimensions of the locking portion 47 relative to the shape and dimensions of the opening 34 in bracket 31 are such that when the actuating member 44 is oriented in one position, such as when the major axis of the locking portion 47 is parallel to the major axis of the rectangular opening 34, then the locking portion 47 may freely move in and out through the opening 34. However, the shape and dimensions of the locking portion 47 and opening 34 are such that when the actuating member 44 is oriented into another position, then the locking portion 47 can not move through the opening 34. For example, upon the major axis of the rectangularly shaped locking portion 47 being disposed in a vertical line, such as shown in FIG. 3, then the locking portion 47 can not move through the opening 34. If it has already been inserted through the opening 34 by being properly turned and then is thereafter turned so as to assume the position illustrated in FIG. 3, then the locking portion is firmly locked within the open space between the bracket 31 and plate member 32. When in this locked position the spring 39 is opposed against its resilient bias to force and to hold the switch element 42 out of electrical engagement with the contact surface 31A and thus to break or open the electrical connection between the wire 29 and ground through the frame 49.

When it is desired to pull on the rope or cable 48, the handle portion 45 is seized and turned to a 90° angle from its original position, that is so that the major part of the locking portion 47 is parallel with the major axis of the opening 34, then the locking portion 47 may be pulled out through the opening 34, such as to its position shown in FIG. 4. Thus when the rope or cable 48 is being pulled by outward extension of the actuating member 44, spring 39 moves the switch element 42 into electrical engagement with the contact surface 31A of the bracket 31 and this electrically interconnects the wire 29 and ground through the bracket 31 and frame 49.

It is therefore seen that when the recoil starting mechanism is being operated by pulling out on the rope or cable 48, the safety switch mechanism is closed and the wire 29 is grounded. This provides an electrical connection to the engine's ignition system at 15 through the circuit made up of wires 24 and 25 if either of the switches 18 or 19 is closed by reason of its respective clutch being engaged. This will prevent operation of the engine if either clutch is engaged. It is to be noted that if the safety switch mechanism is open by being locked in open position by the structure illustrated, then the engine may be operated. The locking of the safety switch mechanism into open position after the engine has been started permits the tractor to be operated and the cutting unit to be operated through the usual engagement of their respective clutches.

To aid in preventing the actuating member 44 and its locking portion 47 from being accidently rotated through vibration or otherwise inadvertently after it has been inserted through opening 34 and rotated 90° to the position illustrated in FIG. 3, there is provided on the leaf spring 39 a boss or off-set portion 39A protruding toward bracket 31 as shown in FIGS. 3 and 4. The locking portion 47 has a groove or longitudinal recess 47A formed therein which may accomodate the boss 39A. The sides of the boss 39A are sloping so that the boss 39A may slidably or cammingly enter into the groove 47A.

It will be understood that the bias of leaf spring 39 will urge the boss 39A to remain in the groove 47A when in the position of FIG. 3. However, by forcibly rotating locking portion 47 the boss 39A may escape the groove 47A. The arrangement provides means that may be manually overcome for holding the parts in the position of FIG. 3.

It will be seen that a safer and more efficient safety start system is here provided by the safety switch mechanism herein shown and described.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an electrical grounding system for a device having an electrically conductive frame, an internal combustion engine mounted on said frame and grounded thereto, an elongated starting member such as a rope or cable to be manually extended for starting the engine, a first clutch for controlling one function of the device, a first switch controlled by the positions of said first clutch in clutched and unclutched condition, a second clutch for controlling a second function of the device, a second switch controlled by the positions of said second clutch in clutched and unclutched condition, an electrical ignition system for said engine, and an electrical circuit for connecting said first and second switches in parallel with ground and with the electrical ignition system of the engine for grounding the ignition system and preventing operation of the engine upon closing of said electrical circuit by the closing of either of said first and second switches by the positioning of either said first and second clutches, respectively, in clutched condition, the improvement of a safety switch mechanism mounted on said device comprising the combination of a mounting bracket carried by said device and grounded to said frame, said bracket having two spaced portions defining an open space therebetween, one of said bracket portions having an electrical contact surafce, a movable switch element carried by the bracket movable into and out of electrical engagement with said contact surface, said movable switch element being electrically connected to said electrical circuit for connecting and disconnecting said electrical circuit with ground, biasing means carried by said bracket and insulated from said movable switch element for biasing said movable switch element into electrical engagement with said contact surface, said two bracket portions having aligned openings through which said elongated starting member extends, an actuating member secured to the free end of said elongated starting member, said actuating member having a handle portion adapted to be manually seized for extending the elongated starting member, having a locking portion, and a shank portion extending between said handle portion and locking portion, the said opening in one of said bracket portions being shaped and dimensioned relative to the cross-sectional shape and size of locking portion and shank portion to permit the said shank portion to pass therethrough but to bar said locking portion to pass therethrough except as the locking portion is oriented relative to the said opening in the one said bracket portion, said locking portion upon being oriented to be passable through the said one opening into the said open space between the said bracket portions and to be lockable therein by being moved out of orientation, and to be removable therefrom by being oriented to pass through the said one opening, said locking portion in said open space engaging and opposing said biasing means to hold said movable switch element out of electrical engagement with said contact surface, the said safety switch mechanism upon the electrical engagement of said movable switch element and the said contact surface connecting the said electrical circuit with ground and upon the electrical disengagement of said movable switch element by said locking portion disconnecting the said electrical circuit with ground.

2. A safety switch mechanism as claimed in claim 1 and in which said biasing means is a leaf spring anchored to one of said bracket portions and carries said movable switch element on its free end resiliently urges the movable switch element against said contact surface.

3. A safety switch mechanism as claimed in claim 1 and in which said locking portion of the actuating member is non-circular in cross-section and is dimensioned in cross-section greater than said shank portion, and the opening in the bracket portion through which the locking portion is passed is non-circular and dimensioned in cross-section so as to permit the locking portion to be passed therethrough into said open space upon the positioning of the actuating member to place the said locking portion in correspondence with said opening, and so as to lock the locking portion in said open space upon the positioning of the actuating member to place the said locking portion out of correspondence with said opening.

4. A safety switch mechanism as claimed in claim 1 and in which the handle portion, shank portion and locking portion of the actuating member are inegrally molded plastic material, and the handle portion and locking portion are rectangular in cross-section and similarly oriented, and in which the shank portion has an axial length to accomodate between the handle portion and locking portion the fingers of the operator seizing the handle portion.

* * * * *